June 11, 1940.                F. E. DETMERS                2,203,777
COMBINATION ACCELERATOR AND BRAKE CONTROL FOR VEHICLES
Filed Aug. 26, 1938
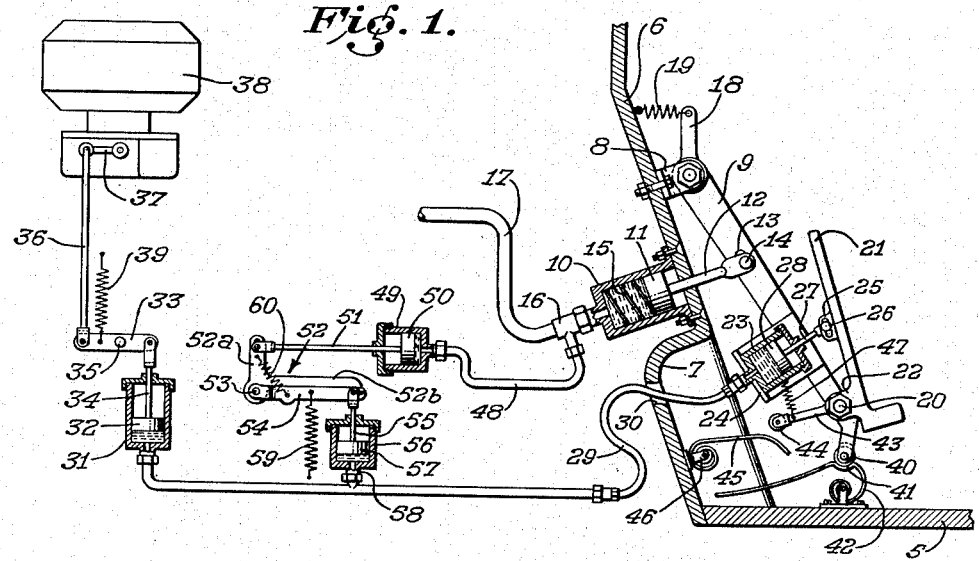
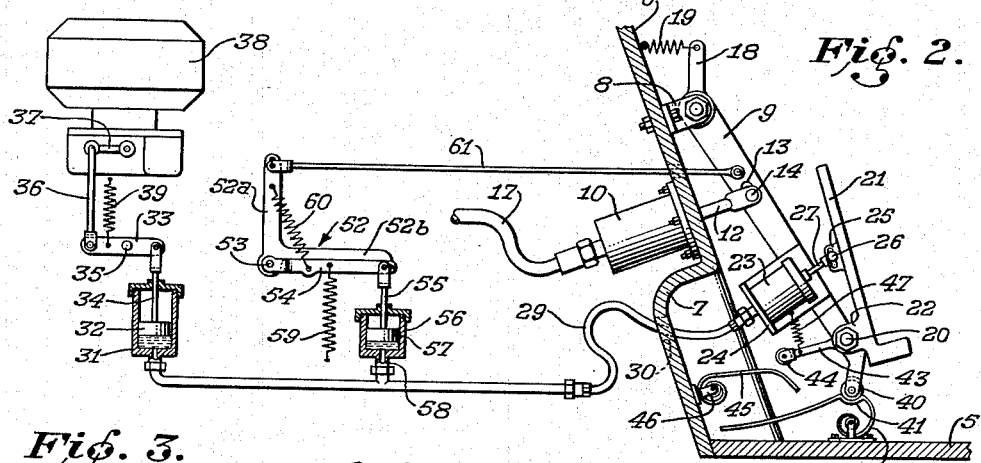
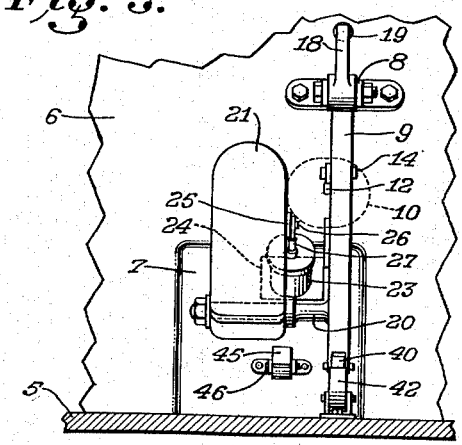
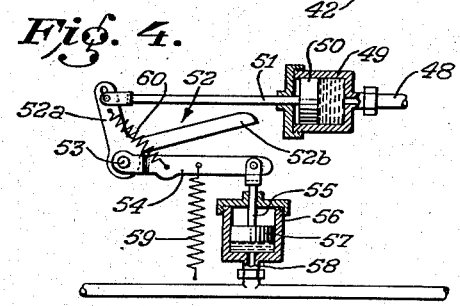
INVENTOR.
Fred E. Detmers
BY Joseph F. Westall
ATTORNEY.

Patented June 11, 1940

2,203,777

UNITED STATES PATENT OFFICE 2,203,777

COMBINATION ACCELERATOR AND BRAKE CONTROL FOR VEHICLES

Fred E. Detmers, Los Angeles, Calif.

Application August 26, 1938, Serial No. 226,948

7 Claims. (Cl. 192—3)

This invention relates to combination accelerator and brake controls for vehicles and contemplates more specifically apparatus operated by a single pedal to control the acceleration and the braking action of an automobile.

The usual construction of automobiles includes within the operator's compartment, an accelerator pedal which is connected to the throttle control of the carburetor to vary the speed of the power unit, and a separate brake pedal adapted to be depressed to operate the individual wheel brakes. An important disadvantage in operation of such prior art controls results from the fact that, while the car is being accelerated, if the driver wishes to apply the brakes it is necessary that he move his foot from the accelerator pedal to the brake pedal which in conventional type vehicles requires upward, lateral and downward movement of the operator's foot, resulting in great inconvenience, and particularly in a loss of time which may jeopardize the safety of the car and occupants.

It is accordingly an object of this invention to provide a foot control for the throttle and brake of automotive vehicles which comprises a single pedal operable by movement in one direction to selectively accelerate and brake the car.

Another object is to provide a combination accelerator and brake control whereby the brake may be applied while the power unit is accelerated; depression of the pedal, incident to the application of the brake, being automatically effective to decelerate the power unit.

Another object is to provide a pedal control for the brake of a vehicle actuated by its depression in combination with means adapted to accelerate the power unit of the vehicle upon release of the brake.

Another object is to provide mechanism to resist movement of the pedal, incident to the application of the brake, by the weight of the operator's foot or by pressure applied for acceleration, but which may be easily overcome by slight additional pressure applied to the pedal by the operator to simultaneously decelerate and apply braking action to the wheels.

Another object is to provide a hydraulic throttle control operated by a pedal within the driver's compartment.

A more specific object is to provide a pivoted member within the operator's compartment, adapted by its depression to actuate the brake, said member carrying a throttle member also adapted for actuation by its depression in combination with means to resist actuating depression of said member while accelerating, and of said pedal while applying the brake.

Numerous other objects and corresponding advantages, such for example, as simplicity in operation and construction, economy of manufacture and positive operation, will be apparent to those of skill in this art upon an examination of the following description read in the light of the accompanying drawing in which:

Fig. 1 is a diagrammatic view of my invention, illustrating its connection and association with pertinent conventional parts of an automotive vehicle;

Fig. 2 is a view similar to Fig. 1 showing a slightly modified form of my invention;

Fig. 3 is a view in elevation of the pedal arrangement on the floor and pedal boards of an automotive vehicle;

Fig. 4 is an enlarged elevation of the apparatus for relieving pressure in the throttle control line when the brake is applied.

Referring to the drawing in detail, the numerals of which indicate similar parts throughout the several views, 5 designates the usual floor board of a vehicle, and 6 the pedal board of my invention which is formed with a depression 7 within the operator's compartment. A stud 8 is bolted to the pedal board above the depression 7. The upper end of an elongated brake member 9 is pivoted to the stud 8. The member 9 extends downwardly to a point adjacent the floor board 5 and is adapted to swing on its pivot toward and away from the pedal board 6. A hydraulic brake master cylinder 10 of any suitable construction within the skill of those engaged in the art is secured to the underside of the pedal board 6 above the depression 7 in alignment with the brake member 9. A piston 11 within cylinder 10 is connected to the member 9 by a rod 12 extending through the pedal board. An elongated slot 13 is formed in the member 9 through which a pin 14 extends; the ends of the pin 14 are attached to the adjacent end of rod 12. A helical spring 15 is provided within the master cylinder 10 to bear against the piston 11 and resiliently maintain the same in the upper portion of the cylinder. A fitting 16, threaded into the underside of the cylinder 10, provides a means of attachment for a hose 17 which leads to individual wheel brakes (not shown). It will thus be observed that movement of the member 9 toward the pedal board 6, by causing downward movement of the piston 11, will actuate the individual wheel brakes by means of the movement of fluid contained in the cylinder 10 and the hose 17, in a manner usual in conventional hydraulic brakes.

The brake member 9 is forged with a lever 18 at its upper end, which extends above stud 8. One end of a spring 19 is attached to the lever 18 and its opposite end is secured to the pedal board to exert a tension on the lever, and thereby resiliently maintain the brake member in its uppermost, inoperative position. A short shaft 20 (Fig. 3) is forged integrally with the side of member 9 and extends laterally of the member over the depression 7. An accelerator pedal 21 is provided with a lug 22 on its underside, by which the pedal 21 is pivoted on the shaft 20. Directly under the accelerator pedal a hydraulic cylinder 23 is secured by suitable means to a plate 24 integral with the side of member 9.

A slotted lug 25 formed on the underside of the pedal above the point of attachment of the pedal to the member, forms a bearing for a pin 26 to which one end of a piston rod 27 is secured. The opposite end of rod 27 extends into cylinder 23 and is connected to a piston 28 within the cylinder. A hose 29 leads from the underside of the cylinder 23 through a hole 30 in the depressed portion of the pedal board 6 of the car to a point adjacent the carburetor (later referred to). The end of hose 29 is connected to a fluid-tight cylinder 31 supported in a suitable manner within the engine compartment. A piston 32 within cylinder 31 is connected externally to a lever 33 by a piston rod 34. The lever 33 is pivoted at its middle on a fulcrum pin 35 which is mounted on a stationary member (not shown) within the engine compartment of the car. An upstanding rod 36 is pivoted to the end of the lever 33 opposite to the end to which piston rod 34 is connected. The upper end of rod 36 is in turn pivoted to the usual rod lever 37 of the conventional type carburetor 38. When the accelerator pedal is depressed, fluid within the cylinder 23 will be forced under pressure from the cylinder by the downwardly-moving piston 28 into the cylinder 31 to raise the piston 32. The upward movement of piston 32 will raise the end of the lever 33 to which the piston rod 34 is attached, causing the downward movement of the rod 36 at the opposite side of the fulcrum pin 35 and accordingly, actuate the accelerating movement of the throttle lever 37. A spring 39 is secured to the lever 33 adjacent the connection of the rod 36 thereto, to normally resist accelerating movement of the throttle lever 37.

It will be observed that depression of the pedal 21 will also tend to depress the brake member 9. To offset this tendency the lower end of the brake member is provided with roller 40 which is normally retained (when the brake is in "off" position) in a depression 41 formed in a spring member 42 which is secured to the floor board by any means well known in the art.

An arm 43 is secured to or forged with the lug 22 on the underside of pedal 21 to form a substantially right angle with the pedal. A roller 44 is carried by the free end of the arm 43 to bear against a spring member 45, about to be described, when the brake is applied and pedal 21 is partially depressed to resist simultaneous depression of the accelerator 21. The spring member 45 is coiled around a pin 46 which is secured to the pedal board within the depression 7 by suitable means. The unattached end of the spring member 45 extends from the pedal below the arm 43 and roller 44 but in vertical alignment therewith, being normally spaced from the roller so that the roller will contact the member 45 when the brake member is in its elevated or inoperative position, only by fully depressing the pedal 21. A helical spring 47 attached to one end to the arm 43 adjacent the roller 44 and at its other end to cylinder 24, maintains a resilient tension on the arm to urge the pedal toward decelerated position.

A hose 48 leads from fitting 16 of the master cylinder 10 to one end of a cylinder 49 in which a piston 50 is disposed. A piston rod 51 connected to the piston 50 extends through the end of cylinder 49 opposite to that in which the hose 48 is connected. The outer end of rod 51 is pivoted to an arm 52a of a bell crank 52, which in turn is fulcrumed at the vertex of its angle as at 53 to a suitable mounting within the engine compartment. An arm 54 is journalled at one end on the pivot 53 and extends along the underside of the arm 52b of the bell crank 52, being adapted to be swung downwardly on its pivot 53 by the downward movement of arm 52b of the crank. A piston rod 55, pivoted to the end of arm 54, extends into a cylinder 56 and is attached to a piston 57 within cylinder 56. The end of cylinder 56 opposite to the end through which rod 55 extends is tapped into the hose 29 between cylinders 24 and 31, as at 58, for a purpose about to be described. A vertically-disposed spring 59 has its upper end attached to the arm 54 intermediate its ends to normally hold the arm 54 in its lowermost position and maintain the piston 57 at the end of its fluid-expelling stroke within cylinder 56 to prevent fluid under pressure from hose 29 from entering cylinder 56, as will appear. The arm 54 is resiliently held against the arm 52b of the bell crank by means of a helical spring 60 secured at one of its ends to arm 52a and at its opposite end to arm 54. The spring 59 is stronger than spring 60 to maintain the arm 54 in a horizontal position and prevent fluid in hose 29 from entering cylinder 56. When the bell crank is tilted, incident to the application of the brake, spring 60 will be extended to counteract much of the tension of spring 59 and render said spring 59 weaker than spring 39 whereupon fluid pressure in hose 29 incident to depression of the pedal 21 will raise piston 57 rather than overcome the tension of spring 39. When the brake is in "off" position, however, the bell crank drum 52b and spring 59 will maintain the piston 57 in its lowermost position whereby fluid from hose 29 will operate the throttle lever upon depression of pedal 21 as hereinafter described.

In the embodiment of Fig. 2, the hose 48 and the pump comprising cylinder 49, piston 50, and rod 51 are omitted and a rod 61 is substituted therefor. One end of the rod 61 is pivoted to the brake member 9 and extends through a hole in the pedal board. The opposite end of the rod is pivotally connected to the end of arm 52a of the bell crank 52.

The operation of my invention is briefly described as follows: A brake member 9 is normally moved to and held in elevated, inoperative position by springs 15 and 19, and the tendency toward depression of member 9 due to the weight of the operator's foot will be off-set by the engagement of roller 40 in depression 41 of spring member 42. The pedal 21 is similarly held in decelerated position by the tension of springs 47, 39 and 59. Acceleration is effected by the operator depressing pedal 21 by the toe or ball of his foot, which operation may be accomplished without displacing the roller 40 from the depression 41 of the spring member 42. This operation of the foot pedal will move fluid under pressure of piston 28 from cylinder 23 through hose 29 and into cylinder 31 to raise the piston 32 and piston rod 34, and thereby lower the end of the lever 33 opposite to the end attached to the piston rod, which will actuate the throttle lever 37 in an obvious manner. As only a slight pressure is required to operate the throttle the pressure in hose 29 will not be sufficient to overcome the tension of spring 59, even as counteracted by non-extended spring 60, which if permitted would raise the piston 56 and enable fluid from the hose to move into cylinder 55. Spring member 42 will be inoperative during acceleration. When it is necessary to apply the wheel brakes the operator will depress the heel and raise the ball of his foot to simultaneously decelerate by causing elevation of the piston 28 in cylinder 23 with consequent relief of pressure on the throttle through the fluid line, and the dislodgment of the lower end of the brake member 9 from the depression 41 in the spring member 42. This movement of the brake member will move the piston in the master cylinder 10 down against the expansive force of spring 15 and convey pressure to each wheel brake through hose 17.

If, however, the operator in applying the brakes inadvertently depresses the brake member with the ball of his foot so as to also depress the accelerator pedal, or should he fail to first decelerate the motor by permitting the upper end of the pedal to raise relative to the brake member, the fluid pressure in the throttle hose 29 will be automatically relieved by the movement of a volume of fluid equal to the volume displaced from the cylinder 23 by the piston 28 into cylinder 56, as about to be described. The pressure created in the master brake cylinder 10, upon displacement of the lower end of member 9 from depression 41 of the spring member 42, will be communicated to cylinder 49 through hose 48 and move the piston therein to the further end of the cylinder, thereby swinging the bell crank 52 on its pivot to relieve pressure of arm 52b on arm 54 and extend the spring 60 to largely counteract the strength of spring 59. Fluid under pressure from hose 29 may then move into cylinder 56 in an amount equal to that displaced from cylinder 23 incident to depression of pedal 21. When the brake is applied in the manner above described, if it is desired to accelerate immediately upon release of the brake, the accelerator pedal may be partially or completely depressed while the brake member 9 is depressed. This operation will not be immediately effective to accelerate the motor due to the movement of the fluid displaced from cylinder 23 into cylinder 56, the piston in the latter cylinder having been raised by the fluid pressure in the hose 29. However, when the brake member is permitted by the driver to be raised to relieve the pressure in cylinder 49, it will be apparent that the piston 51 will again be returned to the end of its fluid-expelling stroke by the downward movement of arm 52b of the bell crank to discharge fluid from cylinder 56 into the hose 29 which will simultaneously increase the pressure within cylinder 31 below piston 32 to operate the throttle and accelerate the motor as the brake on the wheels is released.

The spring member 45 is arranged so as to extend substantially tangentially to the arc of movement of the periphery of the roller 44 as the brake member is swung on its point of pivot to stud 8 when the pedal 21 is in its uppermost inoperative position, whereby any pressure on the pedal tending to depress the piston 28 while the brake is being applied will be resisted by the spring member 45 due to contact therewith by the roller 44.

It will thus be observed that I have provided a single pedal control for motor vehicles operable by depression to selectively accelerate the motor or apply the wheel brake in combination with means to prevent this operation simultaneously. It is to be understood that the drawing is merely illustrative of the various expedients comprising my invention which may be changed in numerous ways as, for example, in size, number, proportion and design of the parts by those of skill in the art, depending largely on the particular vehicle with which the apparatus is to be employed.

What I claim and desire to secure by Letters Patent is:

1. In a device of the character described, a pivoted brake member, wheel brake mechanism, means to connect said member to said mechanism to apply the wheel brakes by swinging said member on its pivot, a pedal pivoted on said member, a cylinder and a piston within said cylinder, a piston rod connecting said piston and pedal to increase pressure within said cylinder by manipulation of said pedal, a throttle lever, means controlled by pressure within said cylinder to actuate said throttle lever, and a spring latch to resiliently resist depression of said brake member.

2. In a device of the character described, a pivoted brake member, wheel brake mechanism, means to connect said member to said mechanism to apply the wheel brakes by swinging said member on its pivot, a pedal pivoted on said member, a cylinder and a piston within said cylinder, a piston rod connecting said piston and pedal to increase pressure within said cylinder by manipulation of said pedal, a throttle lever, means controlled by pressure within said cylinder to actuate said throttle lever, and means to resist depression of said pedal relative to said member during depression of said brake member.

3. In a device of the character described, a brake member and a pedal pivoted on said member, means to pivotally support said member, a throttle lever, fluid means under pressure controlled by said pedal to actuate said throttle lever, and means operable by depression of said member to relieve pressure on said fluid means.

4. In a device of the character described, a brake member having a pedal pivoted thereto, a throttle lever, hydraulic control mechanism for said throttle lever actuated by depression of said pedal, and means to render said control inoperative upon depression of both said pedal and brake member.

5. In a device of the character described, a brake member, wheel brake mechanism actuated by a depression of said member, a pedal pivoted to said brake member, a pump carried by said brake member and actuated by depression of said pedal, a throttle lever, a second pump connected to said throttle lever, means to convey fluid under pressure from the pump carried by said brake member to said second pump, and means actuated by depression of said brake member to relieve pressure created by said first-named pump.

6. In a device of the character described, a brake member, wheel brake mechanism actuated by depression of said member, a pedal pivoted to said brake member, a throttle control lever, a hydraulic control for said throttle lever comprising a pump carried by said brake member and actuated by depression of said pedal, a second pump connected to said throttle lever, means to convey fluid under pressure from the pump carried by said brake member to said second pump, and means actuated by said brake member to render the hydraulic control ineffective.

7. In a device of the character described, a brake actuating member operable by depression, a hydraulic throttle control system, a pedal connected to said throttle control system to actuate the same, a cylinder connected to said hydraulic system to receive fluid therefrom, a piston in said cylinder, and means controlled by said brake actuating member to position said piston in said cylinder to determine the quantity of fluid admitted into said cylinder from said system.

FRED E. DETMERS.